US012657571B2

(12) United States Patent
Garani et al.

(10) Patent No.: US 12,657,571 B2
(45) Date of Patent: Jun. 16, 2026

(54) SYSTEM AND METHOD OF MULTIPLE CLOSED-LOOP SECURED TRANSACTION

(71) Applicant: Jio Platforms Limited, Ahmedabad (IN)

(72) Inventors: Pradeep Garani, Karnataka (IN); Nimish Jain, Karnataka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 48 days.

(21) Appl. No.: 17/763,958

(22) PCT Filed: Sep. 25, 2020

(86) PCT No.: PCT/IB2020/058991
§ 371 (c)(1),
(2) Date: Mar. 25, 2022

(87) PCT Pub. No.: WO2021/059222
PCT Pub. Date: Apr. 1, 2021

(65) Prior Publication Data
US 2022/0391880 A1     Dec. 8, 2022

(30) Foreign Application Priority Data

Sep. 25, 2019    (IN) ............................. 201921038665

(51) Int. Cl.
*G06Q 20/32*          (2012.01)
*G06Q 20/06*          (2012.01)
(Continued)

(52) U.S. Cl.
CPC ......... *G06Q 20/3278* (2013.01); *G06Q 20/06* (2013.01); *G06Q 20/36* (2013.01);
(Continued)

(58) Field of Classification Search
CPC .................................................. G06Q 20/3278
(Continued)

(56) References Cited

U.S. PATENT DOCUMENTS 9,147,187 B1 * 9/2015 Gailloux ................ G06Q 20/36
9,154,477 B2    10/2015 Cambridge
(Continued)

FOREIGN PATENT DOCUMENTS

WO        2021/059222 A1      4/2021

OTHER PUBLICATIONS

Chandrasekar et al, "Recent Developments in Near Field Communication: A Study", Wireless Personal Communications (2021), Published online Sep. 26, 2020, Springer Science + Business Media, LLC. (Year: 2020).*

(Continued)

*Primary Examiner* — John W Hayes
(74) *Attorney, Agent, or Firm* — FINNEGAN, HENDERSON, FARABOW, GARRETT & DUNNER LLP

(57)          ABSTRACT

The present invention relates to a system and a method for performing a closed-loop secured transactions using NFC. The method comprises of receiving a payment selection comprising of instrument selection at a secure element of a first user device. The instrument selection is used to automatically select the closed-loop kernel. The invention further encompasses using symmetric key encryption for the payment selection data which can only be decrypted inside the HSM for quick and hassle-free peer to peer (P2P) or peer to merchant (P2M) closed-loop transactions.

6 Claims, 6 Drawing Sheets

(51) Int. Cl.

| | | |
|---|---|---|
| *G06Q 20/36* | (2012.01) | |
| *G06Q 20/38* | (2012.01) | |
| *G06Q 20/40* | (2012.01) | |
| *G06Q 30/06* | (2023.01) | |

(52) U.S. Cl.
CPC ... *G06Q 20/38215* (2013.01); *G06Q 20/3823* (2013.01); *G06Q 20/3829* (2013.01); *G06Q 20/405* (2013.01); *G06Q 30/06* (2013.01)

(58) Field of Classification Search
USPC .......................................................... 705/67
See application file for complete search history.

(56) References Cited

U.S. PATENT DOCUMENTS

| | | | | |
|---|---|---|---|---|
| 9,842,330 | B1 * | 12/2017 | Van Os | G06Q 20/327 |
| 10,510,074 | B1 * | 12/2019 | Rule | G06Q 20/40 |
| 10,581,611 | B1 * | 3/2020 | Osborn | G06Q 20/204 |
| 10,796,363 | B1 * | 10/2020 | Kim | G06Q 40/03 |
| 10,878,407 | B1 * | 12/2020 | Spector | G06Q 20/405 |
| 11,637,825 | B2 * | 4/2023 | Thampi | G06Q 20/388 |
| | | | | 713/159 |
| 2011/0246363 | A1 * | 10/2011 | Stone | G06Q 20/02 |
| | | | | 705/44 |
| 2014/0337234 | A1 * | 11/2014 | Tang | G06Q 20/3278 |
| | | | | 705/71 |
| 2017/0200149 | A1 * | 7/2017 | Antunovic | G07B 15/02 |
| 2017/0228732 | A1 * | 8/2017 | Badenhorst | H04W 12/30 |
| 2018/0025353 | A1 * | 1/2018 | Collinge | G06Q 20/322 |
| | | | | 705/71 |
| 2020/0005275 | A1 * | 1/2020 | Lee | G06Q 30/0207 |
| 2021/0233163 | A1 * | 7/2021 | Tosmur | G06Q 40/02 |

OTHER PUBLICATIONS

Written Opinion of the International Searching Authority and PCT International Search Report from International Appl. No. PCT/IB2020/058991, mailed Feb. 1, 2021.

* cited by examiner

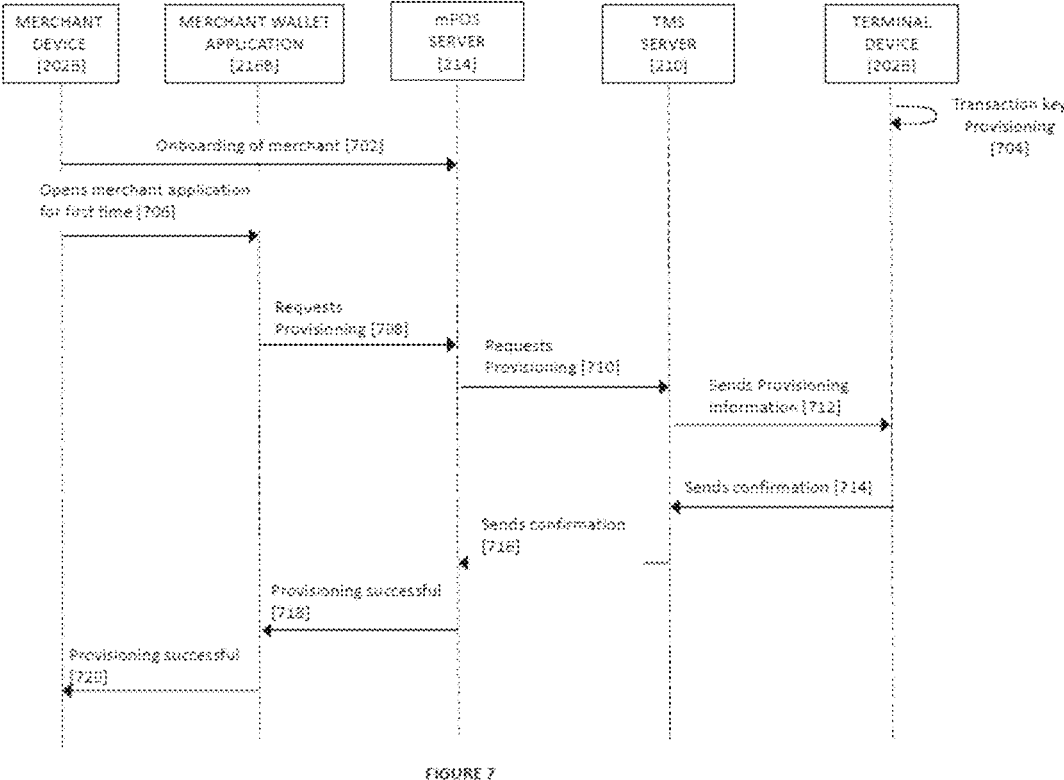
FIGURE 7
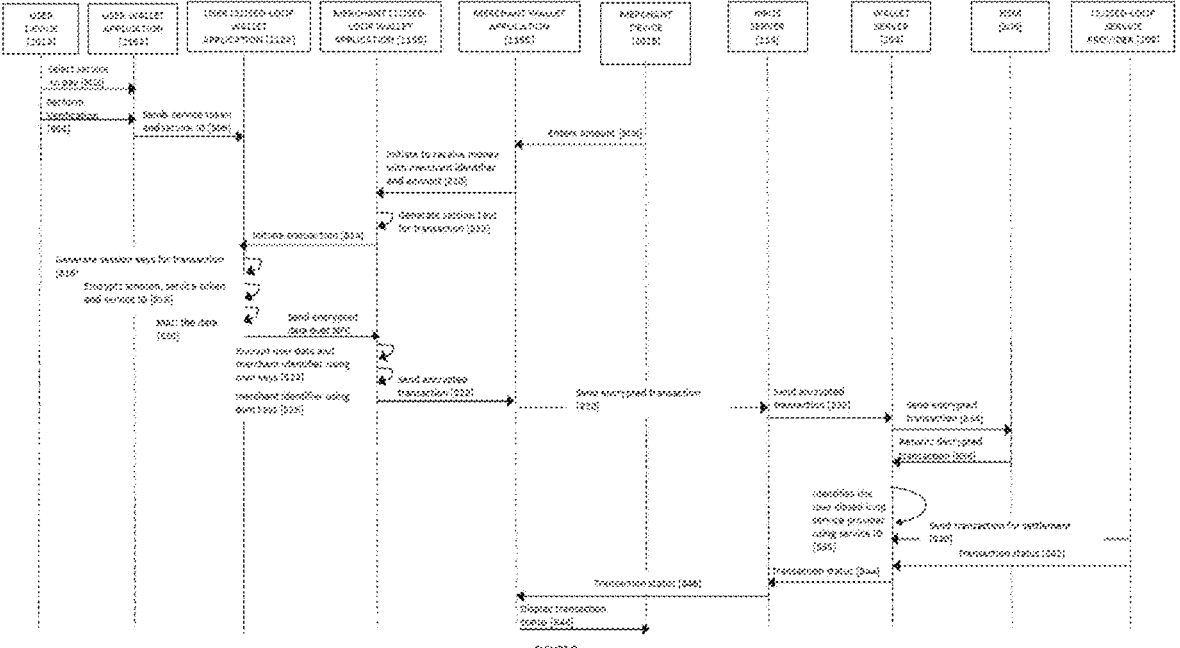

SYSTEM AND METHOD OF MULTIPLE CLOSED-LOOP SECURED TRANSACTION

This application is a national stage filing under 35 U.S.C. § 371 of International Application No. PCT/IB2020/058991, filed on Sep. 25, 2020, which claims the benefit of priority to Indian Application No. IN201921038665, filed on Sep. 25, 2019; the contents of these applications are each incorporated herein by reference.

FIELD OF INVENTION

The embodiments of the present invention generally relate to wireless communication networks, and more particularly relates to managing closed-loop transaction in wireless communication networks.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

An interesting way to replace cash and provide alternatives in a variety of environments is evolving. Such cash alternatives can include, for example, payment devices such as payment cards and the like. The traditional card payment system with credit or debit cards are ubiquitous and for decades such cards have been used to include a magnetic stripe on which the relevant account number is stored. The customer could choose to pay for their transaction via various payment methods: cash, check, debit card, credit card or mobile phone. If the payment is not made in cash, then the payer must have a bank account linked to their check, debit card, credit card or mobile phone payment.

In a payment transaction, there are two parties, first, a payer of funds also referred to as a customer/shopper; and second, an acquirer of funds also referred to as a merchant. In order to enable a payment transaction to conclude, the funds are transferred from the Payer's (Buyer) bank account to the acquirer's (merchant) bank account via a payment network. As a result, a payment processing network is technically all systems involved in authenticating, validating and enabling in real-time the flow of funds from a payer to an acquirer.

The card is swiped through a magnetic stripe reader that is part of the point of sale (POS) terminal to consummate a purchase transaction with the card where the reader reads the account number from the magnetic stripe. The account number is then used to route a transaction authorization request that is initiated by the POS terminal. Also, in order for the customer to be able to conclude a successful payment transaction using their debit card, credit card or mobile payment method; the customer must have a linked bank account to their payment method, and their bank account must have enough funds to cover for the payment transaction.

The customer presents their payment method: debit card, credit card or mobile device to the acquirer's physical location (such as a retail store) or a virtual location (such as a web site) and the acquirer accepts funds from the customer using a payment acquiring system linked to the payment network, which transfers funds from the customer's bank account to the acquirer's bank account.

When acquiring funds from a customer at a physical location, the acquiring merchant requires that the customer swipes their debit card or credit card onto a Point of Sale magnetic card reader device or by requiring the customer to wave their mobile phone by a Point of Sale device which could identify the customer's mobile number or token through Near Field Communication (NFC) wireless technology, a Radio Frequency (RF) tag embedded onto the phone or the phone's SIM card or embedded secure element, two-dimensional bar code technology such as Quick Response (QR) Code technology, or some other wireless technology which enables the merchant to link the mobile phone to the customer's identity.

Once funds are acquired from the customer to the merchant, using the payment network, the funds are then deposited onto the merchant's acquiring bank account. While debit cards and credit cards are similar in some respects, there are significant differences. The cards are issued by an issuing bank, transact on POS systems and settle funds into merchant accounts. As mentioned above, the main difference is that a debit card will not transact if there is insufficient fund in the related bank account.

A payment processing network is an aggregation of payment collection devices such as Point of Sale (POS) devices, computer server systems, banking transaction processing systems, and database server systems which enable the transfer of money from a Payer's bank account (buyer), to an acquirer's bank account (merchant). The Payment may also be made via a mobile device. For example, a smart mobile device may pay via a quick response (QR) code, a mobile device may pay via near field communication (NFC) technology, or a keychain with an internal radio frequency identification (RFID) chip may pay when placed in proximity to the POS.

A further trend in devices electronic payments is the use of so-called "smart" mobile devices or POS or other smart devices in lieu of traditional payment cards. Indeed, devices, such as electronic devices, and particularly electronic payment devices (for example, so-called "smart cards") may be useful for a variety of payment and other applications. In some cases, the smart mobile payment device is not embedded with a transceiver in order to conduct the payment transaction. In fact, the mobile device would embed a software application, also referred to as an "App", to facilitate payment. Such "smart" mobile phones or other devices may be equipped, for example, with electronic wallet applications. These applications would run on a smartphone with a mobile operating system and would display unique payment codes presented in readable letter and digit combinations, single-dimensional barcode, or two-dimensional barcode technology also referred as Q-Codes. Using these codes which are displayed on the phone, the merchant would have the corresponding technology to read the unique code displayed by the device's software app, read it, then securely send the information to a server in order to initiate the payment process of moving funds from the card holder's bank account to the merchant's bank account as shown in FIG. 1.

Open Loop Payment

An open-loop universally accepts credit card, debit card or mobile payment processing network is technically an internationally identified financial card or mobile payment service, typically under trademarks such as PayPal™ Visa™, MasterCard™, American Express™, Discover™, Diners Club™, Rupay™ (accepted in India), JCB™ (accepted in Japan), Union Pay™ (accepted in China) and the like. These are international (universal) networks which enable hundreds of millions of customers or mobile phone subscribers to purchase goods and services at millions of merchant locations. Furthermore, funding rules, returns, fraud coverage and consumer protection governance are stringent and rarely changed. While interest and surcharge rates can be changed frequently, how a merchant authorizes and settles (deposits) funds at their bank is very well defined and rarely modified.

Closed-Loop Payment

A closed-loop payment network is usually a processing system owned by a single retailer. For ex. the Reliance Retail charge card allows the consumer to buy goods and services only at Reliance Retail's stores. It cannot be used at a restaurant, a bar, or a competing retailer. On the other hand, a Visa card allows the consumer to buy goods and services at millions of merchants as long as the card has sufficient funds or available credit. Another good example of a closed-loop payment network which encompasses payments with debit cards, credit cards or mobile phone payment methods is the Starbucks™ closed-loop payment and loyalty system; where a client could walk to a Starbucks™ coffee shop and pay with their Starbucks™ Rewards card or mobile phone which are linked to a bank account, a credit card or debit card. Upon paying with the Starbucks™ Rewards card or mobile phone, the Starbucks™ systems automatically withdraw funds from the buyer's linked bank account to either reload the card or mobile account or wait until the account is depleted then refill. Similar wallet application like Pay™, Mobikwik, Google Pay, etc. act as a closed wallet loop payment with tie-up with the merchant to accept the payment from these wallet applications.

Closed-loop payment networks are typically much easier to build, manage and modify. This is primarily because closed-loop networks are owned by a single entity and are developed and customized by the entity's Information Technology (IT) department which has full control to change credit payment, settlement and loyalty rules. The merchant and its IT department are both judge and jury on any rules relating to its privately issued charge card or mobile payment devices.

The fundamental differences between open and closed-loop payment network: where one is proprietary and self-governing, while the other is universal and publicly acknowledged. Closed-loop payment networks are limited as they accept debit, credit or mobile payments at a single merchant brand compared to being accepted by millions of merchant brands across hundreds of countries, cultures and languages. On the other hand, one cannot change or modify payment or settlement rules of an open-loop network card because such rules need to be modified across thousands of banks, millions of merchants and hundreds of millions of payers.

Consideration will however be given to how closed-loop wallet payment networks work in order to demonstrate the unique value proposition of the present invention which uses the closed-loop wallet mobile payment network model. A sample purchase transaction will assist in understanding how money flows from the payer to the merchant. For example, let's assume that a shopper goes to a spa and decides to pay with a wallet application on a mobile phone instead of cash.

It is believed that the above steps capture the main concepts which take place when a customer uses his or her card or mobile device to make purchases. Note that the above description was for a closed-loop payment network taking place at a physical "brick and mortar" merchant location, and that these steps can be repeated when describing the steps involved when transacting on a closed-loop payment network during a web-based online transaction. In fact, both transactions, online or physical brick and mortar, go through the same steps when utilized in connection with the present invention. The above can work in peer to peer environment.

Near Field Communication (NFC)

The contactless payment technology incorporates proximity communications between two smart devices to authenticate and enable payment for goods and services over the air (OTA) or without a physical connection. The Near Field Communication (NFC) is an example of a proximity communication option that can enable contactless payment technologies and that is supported by Telecom Service Providers (TSP) or Mobile Payment Network Operators (MPNOs). RFID is another example of a proximity communication method that can be adapted to enable NFC contactless payment technology. NFC communication ranges generally range from about 3 to about 4 inches. Such short communication distances limit, as well as, enable secure communication between close field proximity enabled devices. The Proximity enabled contactless payment also can be implemented on CDMA, GSM, LTE and 5G devices with an embedded secure element within an NFC controller or a Re-usable Identification Module (R-UIM) type card.

In smart devices, a proximity enabled (for example, NFC) controller with an antenna is incorporated into the device with the secure contactless software applications located on a smart chip. The smart chip can be further incorporated into one of several exemplary smart device components as shown in FIG. 1 above, including a standard Subscribed Identity Module (SIM) card, a separate Mobile Secure Digital Card (for example, a secure digital (SD) card with non-volatile memory, such as EEPROM), or an embedded chip for the payment module purposes. An NFC-enabled contactless payment smart device enables financial transactions, ticketing, secure authentication, and coupons among several services that are available to the device owner.

The NFC contactless payment device can function as a credit card, debit card, wallet closed-loop app, open-loop app, etc. to enable purchases at the point-of-sale (POS) or even via merchant websites, wherein the latter case a smart device can be used to secure bank information from an authenticating server called a trusted service manager (TSM). The bank information is used in a form entry for payments on a merchant website. The TSM hosts and controls all information sent to or withdrawn from a trusted NFC enabled contactless payment device.

The smart device software applications can be identified by Application Identifiers (AIDS) and are typically stored within the secure element on the smart devices. AIDS may be standardized by the ISO 7816 specification and include between 5 and 16 bytes. The first five bytes collectively of the AID is called a Registered Identifier (RID), which typically identifies the card company—for example, MasterCard®, Discover®, or Visa®. The subsequent bytes may include the PIX or Proprietary application Identifier Extension, which can be used to identify such information as the application type, version, manufacturer, and other information.

Secure Element

The secure element can exist within a removable smart chip, SD card, or embedded within a fixed chip on the smart device. The secure element allows a wallet software application resident on the smart device and accessible by the smart device user to interact securely with certain functions within the secure element, while protecting a majority of the information stored within it. Further, a secure communication channel uses encryption methods for communication between the secure element and external device and software. The secure element on the smart card includes crypto processors for calculating crypto algorithms, memory controller units to manage the Read-Only Memory (ROM), Ready Access Memory (RAM), and EEPROM flash memory within the smart card.

Existing art discloses a solution relating to the usage of Open Loop card in a closed Environment of Transit applicable to contact, contactless & magnetic stripe where process flow is based on a standard EMVCo. online transaction and Authorization Response to EMVCo. flowing through Open Loop Service Provider. Another solution describes where a customer reaches the POS terminal and taps the tag which contains information about Wi-Fi/Bluetooth for A secure communication between POS and customer mobile is established over Bluetooth or Wi-Fi and The transaction information is sent over the Bluetooth/Wi-Fi connectivity where the user selects his card enters the PIN and this data is sent back to POS terminal from where the transaction is completed and the receipt is sent over to the consumer device.

Yet another existing solution describes that for multiple secure applications like Gift cards, etc. which can be topped up automatically with the customer bank's application and customer purchases from one or more merchants from the banking application. The money is transferred within the bank from customer to another account and the settlement between intermediate account to guaranteed account does not happen in real-time. Yet another existing solution facilitates online payment through a POS device where Payment Authorization is sent to the merchant server from the consumer's device where the Authorization is sent from terminal to consumer device wallet application and then to issuer ready to make a payment and selects a card from his wallet on device via NFC to make a payment from his wallet on the device. However, all the disclosures above do not provide any solution for usage of NFC for mobile payments in multiple closed-loop wallet application with a secured transaction based on encryption and MAC.

Thus, there exists a need for system and method for usage of NFC for mobile payments in closed-loop wallet application with secured transaction based on encryption and MAC, also enable multiple Closed-loop Service Providers on the same Closed-loop application inside the Secure Element and provide an automatic selection of Closed-loop kernel depending on the instrument selected by the customer.

SUMMARY

This section is provided to introduce certain objects and aspects of the present invention in a simplified form that are further described below in the detailed description. This summary is not intended to identify the key features or the scope of the claimed subject matter.

In order to overcome at least a few problems associated with the known solutions as provided in the previous section, an object of the present invention is to provide a method and a system for performing closed-loop transaction. Another object of the present disclosure is to provide a system and method for usage of Near-field radio communication (NFC) for performing closed-loop secure transaction based on encryption and MAC. Yet another object of the present disclosure is to provide a system and a method to enable multiple closed-loop service providers on the inside the secure element of the user device for performing closed-loop secure transaction. Yet another object of the present disclosure is to provide a system and a method for automatic selection of closed-loop kernel on the user device depending on an instrument selected by the customer. Yet another object of the present disclosure is to provide a system and a method to secure the closed-loop transactions using symmetric key encryption which can only be decrypted inside a hardware security module (HSM). Yet another object of the present disclosure is to provide a system and a method to enable users for quick and hassle-free peer to peer (P2P) or peer to merchant (P2M) closed-loop transactions where a user can enroll to multiple (any/all) the Closed-loop Instruments and use them to make P2P or P2M transactions.

In order to achieve the aforementioned objectives, the present invention provides a method and system for performing a closed-loop transaction. The method comprises receiving a payment selection for at least one service at a secure element in a first user device, wherein the payment selection further comprises of at least one of a payment information, a service token, an instrument selection and a service identifier for the at least one service. Next, the method comprises transmitting, via a wireless interface, a first data to a second user device, wherein the first data comprises of at least an encrypted payment selection. Subsequently, the method comprises encrypting, by the second user device, the first data based on at least one of a second user device identifier and generating an additional message authentication code and the payment information to generate a second data. Furthermore, the method comprises transmitting, by the second user device, the second data to a payment server. Subsequently, the method comprises decrypting, by a hardware security module, the second data based on the message authentication code. Next, the method comprises transmitting, by the hardware security module, the decrypted second data to at least one closed-loop service provider. Lastly, the method comprises performing a closed-loop transaction by the at least one closed-loop service provider based on the decrypted second data.

Another aspect of the present invention relates to a system for performing closed-loop transaction. The system comprises of a first user device is configured to receive a payment selection for at least one service at a secure element of the first user device, wherein the payment selection further comprises of at least one of a payment information, a service token, an instrument selection and a service identifier for the at least one service. The first user device is further configured to transmit a first data to a second user device via a wireless interface, wherein the first data comprises of at least an encrypted payment selection. The second user device is configured to encrypt the first data based on at least one of a second user device identifier, a message authentication code and the payment information to generate a second data. The second user device [is further configured to transmit the second data to a payment server. A hardware security module is configured to receive the second data from the payment server. The hardware security module is further configured to decrypt the second data based on the message authentication code, and to transmit the decrypted second data to at least one closed-loop service provider. The at least one closed-loop service provider configured to perform a closed-loop transaction based on the decrypted second data.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 7 illustrates an exemplary signal exchange depicting a provisioning process for a merchant instrument, in accordance with exemplary embodiments of the present invention.

FIG. 8 illustrates an exemplary signal exchange depicting a transaction flow between a user device and a merchant device, in accordance with exemplary embodiments of the present invention.

Figure 1:
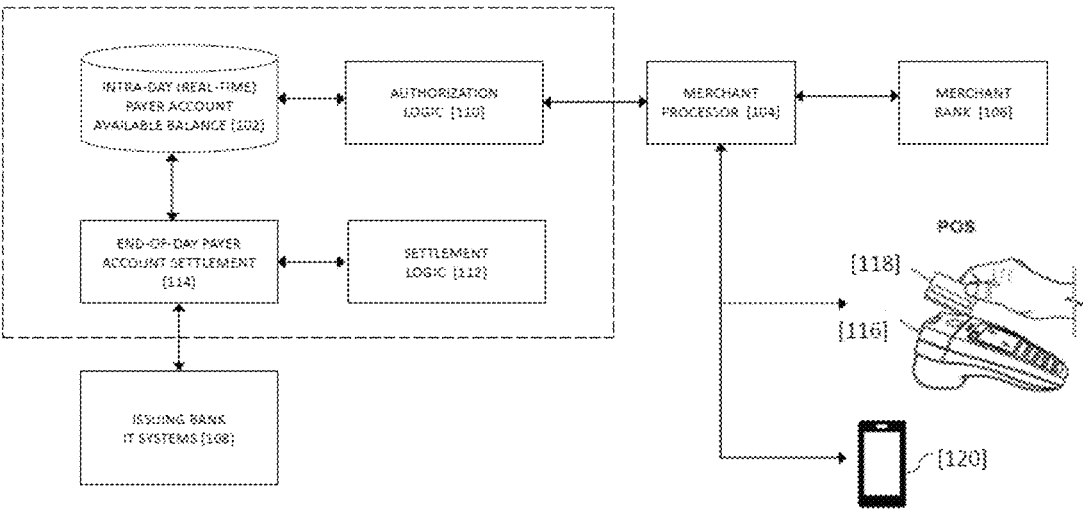
FIG. 1 illustrates an exemplary diagram of an existing payment architecture.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, a "communication unit" or a "transceiver unit" may include at least one of a "transmitter unit" configured to transmit at least one data and/or signals to one or more destination and a "receiver unit" configured to receive at least one data and/or signals from one or more source. The "communication unit" or the "transceiver unit" may also be configured to process the at least one data and/or signal received or transmitted at the "communication unit" or the "transceiver unit". Also, the "communication unit" or the "transceiver unit" may further include, any other similar units obvious to a person skilled in the art, required to implement the features of the present invention.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

As used herein, a "controller" or "control unit" includes at least one controller, wherein the controller refers to any logic circuitry for processing instructions. A controller may be a general-purpose controller, a special-purpose controller, a conventional controller, a digital signal controller, a plurality of microcontrollers, at least one microcontroller in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor that comprises a memory and a processor. The memory is configured to store the modules and the processor is specifically configured to execute said modules to perform one or more processes which are described further below.

Hereinafter, exemplary embodiments of the present disclosure will be described in detail with reference to the accompanying drawings so that those skilled in the art can easily carry out the present disclosure.

The present invention provides solution to the above-mentioned problem of the current systems by providing a novel a method and system that provides a novel method that can provide system and method for usage of NFC for mobile payments in closed-loop wallet application with secured transaction based on encryption and MAC, also enable multiple Closed-loop Service Providers on the same Closed-loop application inside the Secure Element and provide an automatic selection of Closed-loop kernel depending on the instrument selected by the customer.

Figure 2:
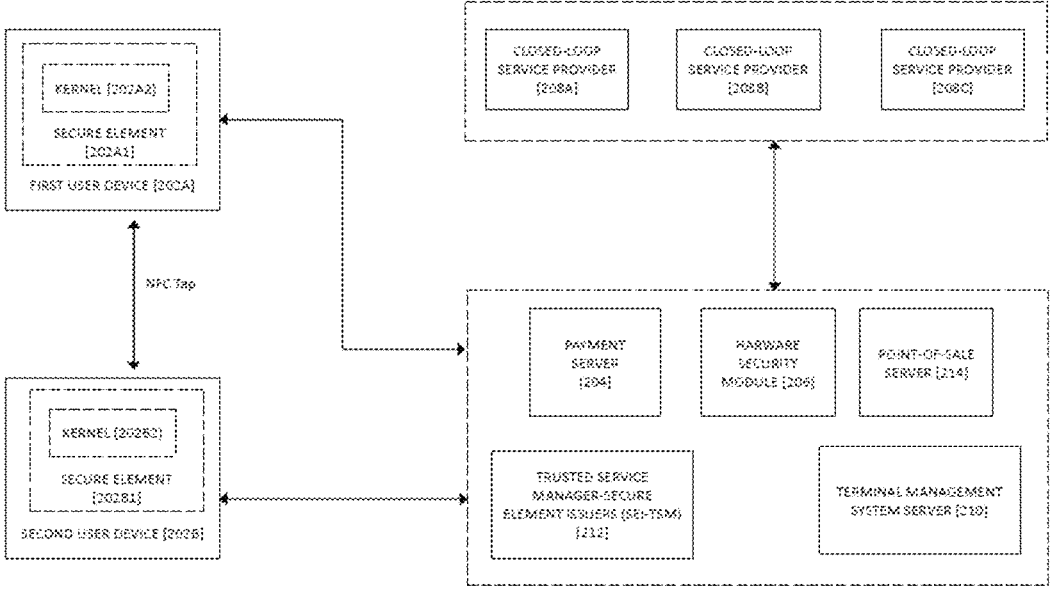
FIG. 2 illustrates an exemplary high-level block diagram of a system for performing closed-loop transaction, in accordance with exemplary embodiments of the present invention.

Referring to FIG. 2 illustrates an exemplary high-level block diagram of a system for performing closed-loop transaction, in accordance with exemplary embodiments of the present invention. As shown in FIG. 2, the system [200] comprises a first user device [202A], a second user device [202B], a payment server [204] (also hereinafter referred to as wallet server), a hardware security module [206], at least one closed-loop service provider [208a, 208b, 208c, . . . 208n, hereinafter collectively referred to as 208], trusted service manager-secure element issuers (sei-tsm) [212], terminal management system server [210] and a point of sale server [214], all the components are connected are to each other and work in conjunction to achieve the objectives of the present invention.

The first user device [202A] comprises of a wallet application [216A] further comprising of a secure element [202A1], wherein the secure element [202A1] further comprising of a kernel [202A2] and a closed-loop wallet application [218A], a transceiver and a wireless interface (not shown in the figure). The first user device [202A] is configured to receive a payment selection for at least one service at a secure element [202A1] of the wallet application residing on the first user device [202A], wherein the payment selection further comprises of at least one of a payment information, a service token, an instrument selection and a service identifier for the at least one service. For example, the first user device [202A] is used by a user (or a customer) who wishes to make a payment using NFC. Thus, the first user device [202A] is configured to transfer and/or receive payments.

As used herein, "wallet application" is a set of instructions executed on a user device to digitize closed-loop instruments for payments. The secure element [202A1] is a tamper-resistant platform (e.g., typically a one chip secure microcontroller) capable of securely hosting applications and their confidential and cryptographic data (for example, cryptographic keys, etc.) in accordance with the rules and security requirements set by well-identified trusted authorities. There are different form factors of the secure element [202A1], broadly, an embedded and integrated SEs, a SIM/UICC, a smart microSD as well as smart cards. The closed-loop kernel [202A2] referred to herein can be understood as a set of instructions residing in the secure element [202A1] of the first user device [202A] (also present in the second user device [202B]). When NFC tap happens, the closed-loop kernel on both sides transfer secures data between each other. The closed-loop kernel can send and receive a transaction. The closed-loop kernel encrypts and MACs the data using dynamic keys during the transaction.

The first user device [202A] is further configured to transmit a first data to a second user device [202B] by the transceiver via a wireless interface, wherein the first data comprises of at least an encrypted payment selection. in this regard, the present invention encompasses that the first user device [202A] is configured to generate a session key for the payment selection received at the secure element [202A1] of the first user device [202A], and to encrypt the payment selection based on the generated session key and the message authentication code.

The present invention further encompasses that the wireless interface is a contactless interface including but not limited to radio waves, light waves, sound waves, etc. In an instance, the wireless interface is at least one of a near field communication (NFC) interface. In another instance, the present invention also encompasses that the first user device [202A] is further configured to activate the wireless interface based on the payment selection received at the secure element [202A1]. In yet another instance, the present invention encompasses that the first data is transmitted from the first user device [202A] to the second user device [202B] via the wireless interface based on one of a tap and a threshold distance between the first user device [202A] and the second user device [202B].

The present invention further encompasses that the at least one closed-loop service provider [208] is onboarded at the secure element [202A1] of the first user device [202A] and the second user device [202B]. In operation, the at least one closed-loop service provider [208] is determined based on the instrument selection received at the secure element of the first user device [202A].

The second user device [202B] is configured to receive the first data from the first user device [202A]. The second user device [202B] is further configured to encrypt the first data based on at least one of a second user device identifier, a message authentication code and the payment information to generate a second data. In this regard, the present invention encompasses that the second user device [202B] is further configured to generate a symmetric session key for the first data received at a secure element [202A1] of the second user device [202B], and to encrypt the first data based on at least the generated symmetric session key to generate the second data. The second user device [202B] is further configured to transmit the second data to a payment server [204].

The present invention encompasses that in an instance the second user device [202B] is a merchant user device. In this regard, the second user device [202B] is configured to transmit the second data to the merchant payment server [204]. In operation, the merchant user device [202B] acts as a point-of-sale terminal for acceptance of NFC Tap and Pay. The merchant user device [202B] hosts a merchant application to be used by the merchant. The merchant user device [202B] may be a physical terminal device or a smart device or a mobile phone-based POS. The merchant user device [202B] can select either an open loop or closed-loop kernel automatically or manually selected by the merchant.

The payment server [204] is responsible for the enrolment of closed-loop instruments on wallet application. The wallet server [204] is configured to receive the second data from the second user device [202B1], and to transmit the second data to the hardware security module [206]. The wallet server [204] is further configured to aggregate different closed-loop system and for managing different services offered in the closed-loop system, for e.g., services include but are not limited to adding a card, bank account, transport service, loyalty card, an access service, etc. The wallet server [204] is also configured to send the transaction for settlement to the Closed-loop Service Provider [208]. The wallet server [204] is further configured to manage transaction cryptogram decryption and validation, and for routing of transactions to correct closed-loop system.

The hardware security module [206] is configured to receive the second data from the payment server [204]. The hardware security module [206] is further configured to decrypt the second data based on the message authentication code, and to transmit the decrypted second data to at least one closed-loop service provider [208]. The present invention encompasses that the hardware security module [206] can be employed in any application that uses digital keys. The hardware security module [206] is also configured to onboard secure cryptographic key generation and onboard secure cryptographic key storage, at least for the top-level and most sensitive keys, which are often called master keys. The hardware security module [206] is also responsible for key management. The hardware security module [206] is further configured to use cryptographic and sensitive data material, for example, performing encryption or digital signature functions. The hardware security module [206] is further configured to offload application servers for complete asymmetric and symmetric cryptography. The hardware security module [206] is further configured to secure a full software stack from logical or physical attacks, etc.

The at least one closed-loop service provider [208] is configured to receive the decrypted second data from the hardware security module [206]. The at least one closed-loop service provider [208] is further configured to perform a closed-loop transaction based on the decrypted second data. As used herein, the closed-loop service providers are the entities which provide closed-loop services to their users (or customers). The users (or customers) can make payments to other users (or customers) or merchants within the same entity. Each closed-loop service provider [208] entity is provided with a unique identifier by the payment server [204] during onboarding.

In the instance that the second user device [202B] is a merchant user device, the present invention encompasses that the merchant payment server [204] is further configured to transmit the second data to a point-of-sale (POS) server [214] using a transport layer security (TLS) protocol, wherein the POS terminal further transmits the second data to the hardware security module [206]. As used herein, the point-of-sale (POS) server [214] is a web-based server responsible for handling merchant registration and forwarding transactions from the point-of-sale (POS) server [214] to the acquirer system. Any merchant acquired is registered in the point-of-sale (POS) server [214]. When a transaction is performed the cryptogram generated from merchant user device [202B], is received by the point-of-sale (POS) server [214], validated and forwarded to the closed-loop network for processing.

The Terminal Management System (TMS) Server [210] is responsible for managing the lifecycle of the mPOS Applet on the mPOS device (the merchant device [202B]). The mPOS server [214] shall request the TMS [210] server to install, personalize or uninstall the mPOS applet on the mPOS device. The Trusted Service Manager-Secure Element Issuers (SEI-TSM) [212] acts as a neutral broker that sets up business agreements and technical connections with the mobile network operators, phone manufacturers or other entities controlling the secure element on smart devices such as mobile phones. The SEI-TSM [212] enables service providers to distribute and manage their contactless applications remotely by allowing access to the secure element in NFC-enabled handsets. In an instance, the SEI-TSM [212] is a certified for "Global Platform Messaging Specification for Management of Mobile NFC Services".

Figures 3, 4:
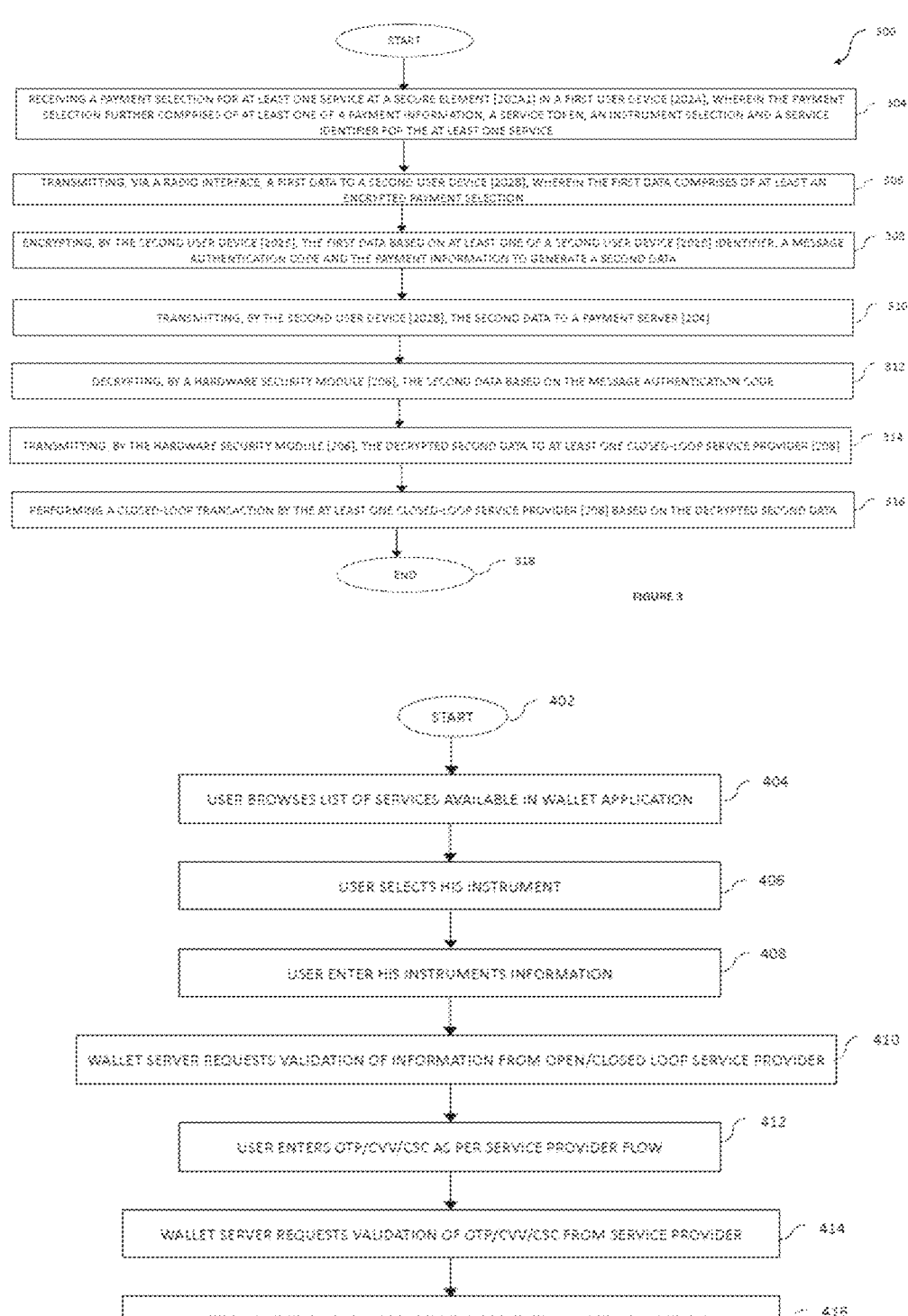
FIG. 3 illustrates an exemplary method flow diagram depicting a method for performing closed-loop transaction, in accordance with exemplary embodiments of the present invention.
FIG. 4 illustrates an exemplary method flow diagram depicting an enrolment process for an instrument, in accordance with exemplary embodiments of the present invention.

Referring to FIG. 3 illustrates an exemplary method flow diagram depicting a method for performing closed-loop transaction, in accordance with exemplary embodiments of the present invention. The method begins at step [302]. The method at step [304] comprises continuously receiving a payment selection for at least one service at a secure element [202A1] in a first user device [202A], wherein the payment selection further comprises of at least one of a payment information, a service token, an instrument selection and a service identifier for the at least one service.

Next, at the step [306], the method comprises transmitting, via a wireless interface, a first data to a second user device [202B], wherein the first data comprises of at least an encrypted payment selection. In this regard, the present invention encompasses that the first user device [202A] generates a session key for the payment selection received at the secure element [202A1] of the first user device [202A] and encrypts the payment selection based on the generated session key and the message authentication code.

The present invention further encompasses that transmitting the first data to the second user device [202B] via the wireless interface further comprises activating the wireless interface based on the payment selection received at the secure element [202A1]. In another instance, the present invention encompasses that the first data is transmitted from the first user device [202A] to the second user device [202B] via the wireless interface based on one of a tap and a threshold distance between the first user device [202A] and the second user device [202B].

At step [308], the method comprises encrypting, by the second user device [202B], the first data based on at least one of a second user device [202B] identifier, a message authentication code and the payment information to generate a second data. In this regard, the present invention encompasses that encrypting the first data by the second user device [202B] further comprises generating a symmetric session key for the first data received at a secure element [202A1] of the second user device [202B] and encrypting the first data based on at least the generated symmetric session key to generate the second data.

Next, at step [310], the method comprises transmitting, by the second user device [202B], the second data to a payment server [204], wherein the payment server [204] further transmits the second data to a hardware security module [206]. Subsequently, at step [312], the method comprises decrypting, by the hardware security module [206], the second data based on the message authentication code.

Next, at step [314], the method comprises transmitting, by the hardware security module [206], the decrypted second data to at least one closed-loop service provider [208]. Lastly, at step [316], the method comprises performing a closed-loop transaction by the at least one closed-loop service provider [208] based on the decrypted second data. The method completes at step [314].

The present invention further encompasses that the method further comprises receiving a status of the closed-loop transaction from the at least one closed-loop service provider [208] at least at one of the first user device [202A] and the second user device [202B], and displaying the status of the closed-loop transaction on at least at one of the first user device [202A] and the second user device [202B]. In another instance, the present invention encompasses that the wireless interface is a contactless wireless interface, e.g., a near field communication (NFC) interface.

The method of the present invention further encompasses that in an instance the second user device [202B] is a merchant user device, the second user device [202B] transmits the second data to a merchant payment server [204]. The method further comprises transmitting, by the merchant payment server [204], the second data to a point-of-sale (POS) server [214] using a transport layer security (TLS) protocol, wherein the POS terminal further transmits the second data to the hardware security module [206].

The present invention further encompasses that the at least one closed-loop service provider [208] is onboarded at the secure element [202A1] of the first user device [202A] and the second user device [202B]. The hardware security module [206] transmits the decrypted second data to the at least one closed-loop service provider based on the instrument selection. [208] The present invention also encompasses a process for onboarding the at least one closed-loop service provider [208]. In operation, the Closed-loop Service Provider (CLSP) [208] shall approach the Wallet Server [204] to onboard itself to Closed-loop Tap & Pay System as described above. For instance, the CLSP [208] is provided with a web interface to upload its data with the minimum details including but not limited to, Logo, Name, RSA/ECC Certificate for TLS Encryption, RSA/ECC Public Key for Encrypting User's Instrument during transmission, etc. The Wallet Server [204] saves this information in its database and assign a unique ID to each CLSP [208] as described in the Table 1 below.

TABLE 1

| CLID (Service Provider ID) | Wallet Provider Name | Icon Data (Base 64) | Certificate | PublicKey |
|---|---|---|---|---|
| 1 | WP1 | — | — | — |
| 2 | WP2 | — | — | — |
| 3 | WP3 | — | — | — |

Each user's token is mapped to the CLSP [208] for identification of the CLSP [208] during the transaction. The CLSP Certificate shall be used by Wallet Server [204] for TLS encryption for all API calls over HTTPS. An RSA/ECC certificate of the Wallet Server [204] shall be shared with CLSPs [208]. Any request from CLSPs [208] for the user's device management (Add/Update/Delete) shall be encrypted using this key for TLS encryption for all API calls over HTTPS.

The Wallet Server [204] integrates the CLSP [208] by using the interfaces provided to CLSP [208]. The interfaces will be for enabling a consumer/user to enrol his account to the system and for forwarding the transaction cryptogram from the Wallet Server [204] to the at least one Closed-loop Service Provider [208] for settlement.

Referring to FIG. 4 illustrates an exemplary method flow diagram depicting an enrolment process for an instrument, in accordance with exemplary embodiments of the present invention. The method starts at step [402]. At step [404], the user browses a list of services available in wallet application. At step [406], user selects his instrument, and enters his information (identity details, etc.) at step [408]. At step [410], the wallet server [204] requests validation of information from the at least one closed-loop service provider [208]. At step [412], the user enters OTP/CVV/CSC as per the closed-loop service provider [208] flow. At step [414], the wallet server [204] requests validation of OTP from the closed-loop service provider [208]. At step [416], after successful validation, the instrument is added to the wallet application. The method completes at step [418].

The present invention encompasses that the various steps involved in the enrolment process are hidden from the user (or consumer). The present invention also encompasses that each instrument may follow its own process. These processes including the security information is hidden from the user (or consumer). The user (or consumer) just needs to enter information as requested on subsequent screens of the Wallet Application making the experience smooth for the user (or consumer).

The present invention also encompasses that the wallet server [204] provides a service discovery functionality which provides the list of closed-loop service providers [208] who are integrated with Wallet Server [204] for accepting digitization service. Upon start-up, the Wallet Application requests the Wallet Server [204] for service discovery and updates its internal database in case of newly added/removed services. The Wallet Server [204] should respond with the list of Wallet Service Provider ID's (CLSP IDs) with respective name and icons so that wallet application can display the list in the Add Card/Wallet menu option.

In an instance, the service discovery response packet from the Wallet server [204] consists of below fields as illustrated in Table 2:

TABLE 2

| CLSP ID (Closed-loop Service Provider ID) | Wallet Provider Name | Icon Data (Base 64) |
|---|---|---|
| 1 | WP1 | — |
| 2 | WP2 | — |
| 3 | WP3 | — |

Figure 5:
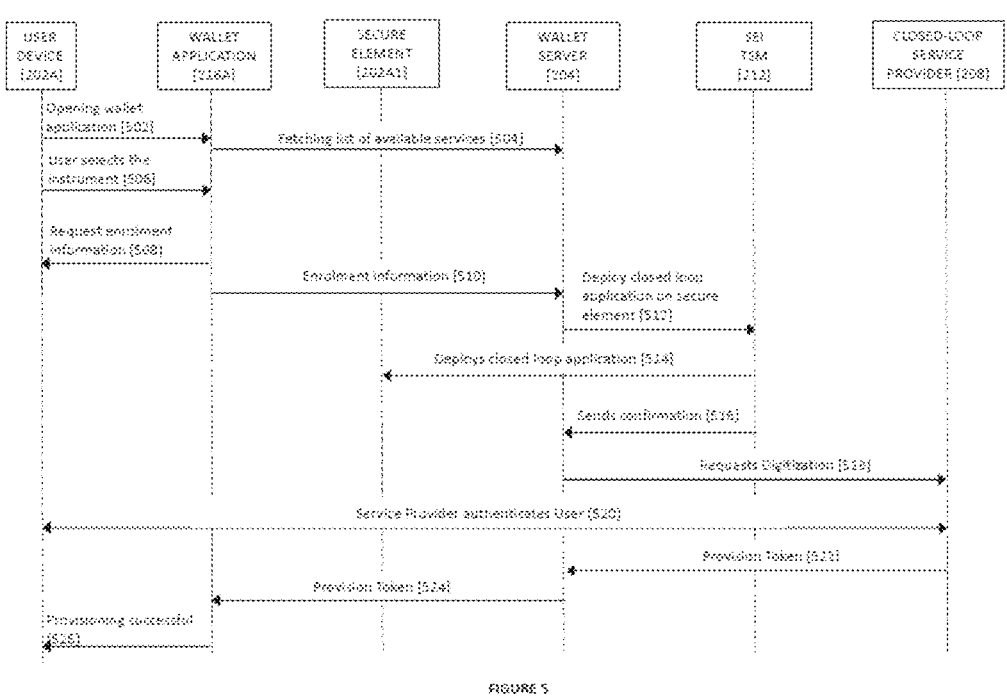
FIG. 5 illustrates an exemplary signal exchange diagram depicting a provisioning process for a user instrument, in accordance with exemplary embodiments of the present invention.

Referring to FIG. 5 illustrates an exemplary signal exchange diagram depicting a provisioning process for a user instrument, in accordance with exemplary embodiments of the present invention. At step [502], the user opens wallet application on the user device [202]. At step [504], the wallet application [216A] fetches available services from the Wallet Server [204]. The services shall be provided by the at least one Closed-loop Service Providers [208] onboarded on the Wallet Server [204]. Each service is mapped to a Closed-loop device/instrument. At step [506], the user selects his service. The enrollment process for each service is predefined by the wallet server [204]. This enrollment process is dynamic in nature and the wallet server [204] notifies the wallet application [216A] to display the appropriate screen depending upon the step of the enrollment process.

At step [510], the wallet application requests the user relevant enrollment information, e.g., for closed-loop the information can be a mobile number of the user to which the account is linked. This mobile number can also be prefilled by the wallet application [216A] if this information is already known to wallet server [204]. In an instance, this information is encrypted using RSA 2048 bits public key of the wallet server [204] for closed-loop instrument. At step [512], the wallet application [216A] sends this encrypted information and service IS over a secured TLS channel to the wallet server [204].

At step [512], the Wallet Server [204] requests SEI-TSM [212] to deploy Closed-loop Application to the Secure Element [202A1]. The deployment consists of 3 phases, namely, phase 1: the application if unavailable on Secure Element is installed, phase 2: a new instance of the applet is created, and phase 3: the instance is personalized. All the above said steps are performed securely using Global Platform SCP02/03/80 channel.

At step [514], the SEI-TSM [212] uses a TSM agent embedded inside the Wallet Application [216A] which acts as a proxy between TSM and Secure Element. Any commands to be sent to Secure Element from TSM are first downloaded by the TSM agent or pushed to the TSM agent which are sent to the Secure Element. The result of the commands is sent to the TSM server by the TSM agent. Once the deployment of the applet is successful, an Async response from SEI-TSM [212] is sent back to the Wallet Server [204] at step [516].

The Wallet Server [204] identifies which Closed-Loop Service Provider [208] the information should be forwarded based on the service ID. The RSA/ECC public of Closed-loop Service Provider [208] is extracted from the Wallet Server database. The encrypted instrument information and the Service Provider Public Key is sent together to HSM [206] for translation from instrument information under Wallet Server key to Service Provider Key. Hence the information is securely transferred from Wallet to Closed-loop Service Provider [208] at step [518].

At step [520], the at least one closed-loop service provider [208] does an additional step of authenticating the user. In an instance, the authentication is performed typically by sending an OTP by SMS or email. This OTP has to be entered in the Wallet application [216A] by the user which is routed to the at least one closed-loop Service Provider [208] by the Wallet Server [204]. Authentication can also happen over the Voice or Call Centre. Once the authentication is successful, at step [522], the at least one Closed-loop Service Provider [208] sends a Provision Token request to the Wallet Server [204]. This token is securely transferred from the at least one closed-loop Service Provider [208] to the Wallet Server [204]. At step [524], the Wallet Server [204] sends the token to Wallet Application [216A] and save it in the Wallet Application [216A]. Lastly, at step [526], the Wallet Application [216A] shows success message to the user.

Figure 6:
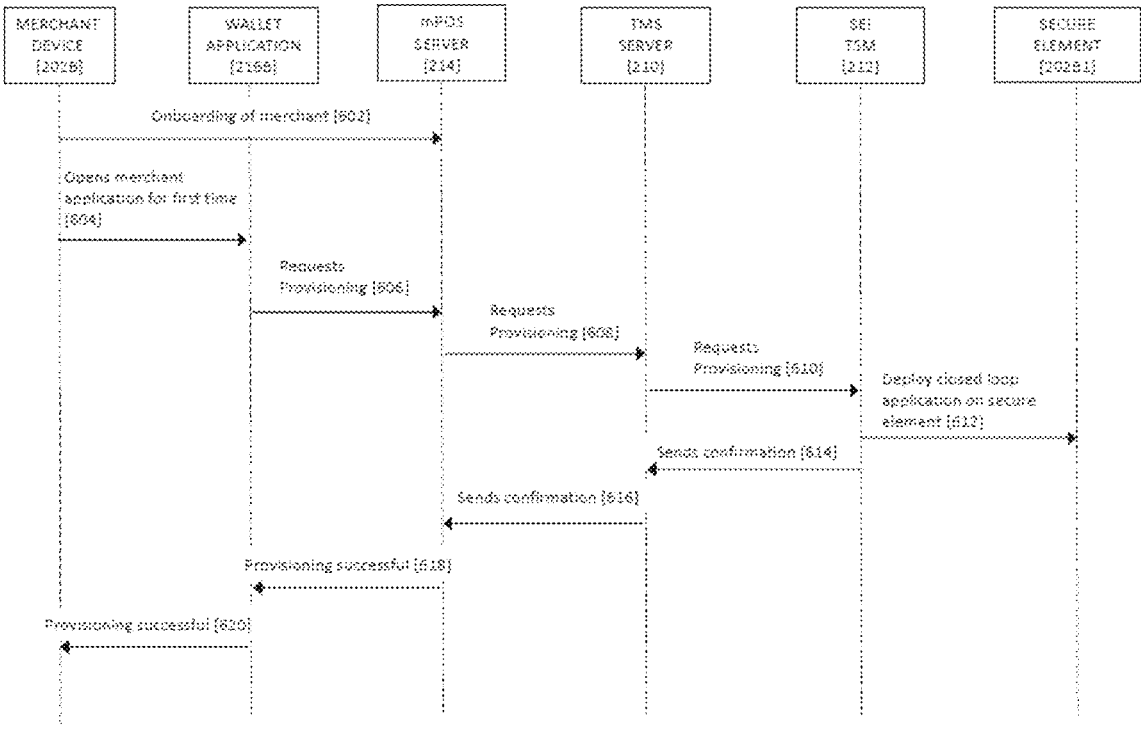
FIG. 6 illustrates an exemplary signal exchange depicting an enrolment process for a merchant instrument, in accordance with exemplary embodiments of the present invention.

Referring to FIG. 6 illustrates an exemplary signal exchange depicting an enrolment process for a merchant instrument, in accordance with exemplary embodiments of the present invention. At step [602], the merchant is onboarded to the mPOS Server [214]. The onboarding process in general, and the merchant is onboarded. At step [604], the merchant opens the merchant wallet application [216B] for the first time, the Merchant Wallet application [216B] requests for the provisioning of Closed-loop Wallet Application [218B] on the Secure Element to the mPOS Server [214] at step [606]. At step [608], the mPOS Server [214] sends the provisioning request to the TMS [210]. At step [610], the TMS [210] forwards the provisioning request to the SEI-TSM [212].

At step [612], the SEI-TSM uses a TSM agent embedded inside the Wallet Application [216B] which acts as a proxy between the TSM [210] and the Secure Element [202B1]. Any commands to be sent to the Secure Element [202B1] from the TSM [210] are first downloaded by the TSM agent or pushed to the TSM agent which are sent to the Secure Element [202A1]. The result of the commands are sent to the TSM server by the TSM agent. At step [614], once the deployment of the Closed-loop Application [218B] is successful, an Async response from the SEI-TSM [212] is sent back to the TMS [210]. At step [616], the TMS [210] sends the notification to the mPOS Server [214] of successful provisioning. At step [618], the mPOS Server [214] sends notification of successful provisioning to the Merchant Wallet Application [216B]. At step [620], the Merchant Wallet Application [216B] displays a success message to the merchant.

Referring to FIG. 7 illustrates an exemplary signal exchange depicting a provisioning process for a merchant instrument, in accordance with exemplary embodiments of the present invention. At step [702], the Merchant Terminal Device [202B] is provisioned with the Transaction Key in the factory. The key can also be provisioned over the air using the Remote Key Injection System. At step [704], the merchant is onboarded to the mPOS Server [214]. At step [706], the merchant opens the application [216B] for the first time. At step [708], the Merchant Wallet application [216B] requests for provisioning of Closed-loop Wallet Application [216B] on the Terminal Device [202B] to the mPOS Server [214]. At step [710], the mPOS Server [214] sends the provisioning request to the TMS [210]. At step [712], the TMS [210] provisions the Merchant Terminal Device [202B] with the Closed-loop Application [218B] and receives confirmation of the provisioning at step [714]. At step [716], the TMS [210] sends the notification to the mPOS Server [214] of successful provisioning. At step [718], the mPOS Server [214] sends notification of successful provisioning to the Merchant Wallet Application [216B]. At step [720], the Wallet Application [216B] displays a success message to the merchant.

Referring to FIG. 8 illustrates an exemplary signal exchange depicting a transaction flow between a user device and a merchant device, in accordance with exemplary embodiments of the present invention. At step [802], a user opens his Wallet Application [216A] and selects a Service he wants to use to pay. At step [804], the user performs local CDCVM PIN verification with the CRS applet installed on the Secure Element [202A1]. At step [806], the user wallet application [216A] sends service token and service ID to Closed-loop Application [218A] in the Secure Element [202A1] on the User's device [202A]. The User's Closed-loop Application [218A] shall now be activated on the contactless interface of User's device [202A].

At step [808], in parallel, a Merchant opens his Merchant Wallet application [218A] and enters amount. The amount entry can also happen in the User's device [202B] by the User or on both the devices. At step [810], the merchant wallet application [218A] sends the amount and the merchant Identifier to the merchant's Closed-loop Application. The Merchant terminal [202B] and the User device [202A] are tapped for the NFC transaction. At step [812], the Merchant Closed-loop Wallet Application [218B] generates symmetric session keys for transaction encryption. At step [814], the Merchant Closed-loop Wallet Application [218B] initiates a transaction to the User Closed-loop Wallet Application [218A]. At step [816], the User Closed-loop Application [218A] generates session keys for the transaction.

At step [818], the User Closed-loop Application [218A] encrypts amount, service token and service id with session keys. At step [820], the User Closed-loop Application [218A] MAC's the data. At step [822], the User Closed-loop Application [218A] sends encrypted data over NFC. At step [824], the Merchant Closed-loop Application [218B]

encrypts User's data received over NFC and its own Merchant identifier and amount. At step [826], the Merchant Closed-loop Application [218B] MAC User's data received over NFC and its own Merchant identifier and amount. At step [828], the Merchant Closed-loop Application [218B] sends the transaction data to Merchant Wallet Application [216B]. At step [830], the Merchant Wallet Application [216B] sends the encrypted transaction data to the mPOS server [214] over TLS. At step [832], the MPOS Server [214] forwards the encrypted transaction data to Wallet Server [204] for processing.

At step [834], the Wallet Server [204] sends the encrypted data to the HSM [206] for decryption. At step [836], the HSM [206] decrypts the transaction and validates the MAC internally and returns decrypted data to the Wallet Server [204]. At step [838], the Wallet Server [204] identifies the Closed-loop Service Provider [208] from the User service ID received in the transaction. At step [840], the wallet server [204] sends the transaction for settlement to the Closed-loop Service Provider [208]. At step [842], the Closed-loop service provider [208] sends the transaction status back to the Wallet Server [204]. At step [844], the Wallet Server [204] sends the transaction status to the mPOS Server [214]. At step [846], the mPOS Server [214] sends the transaction status to Merchant wallet application [216B]. At step [848], the Merchant Wallet Application [216B] displays the transaction status to the merchant.

Figure 9:
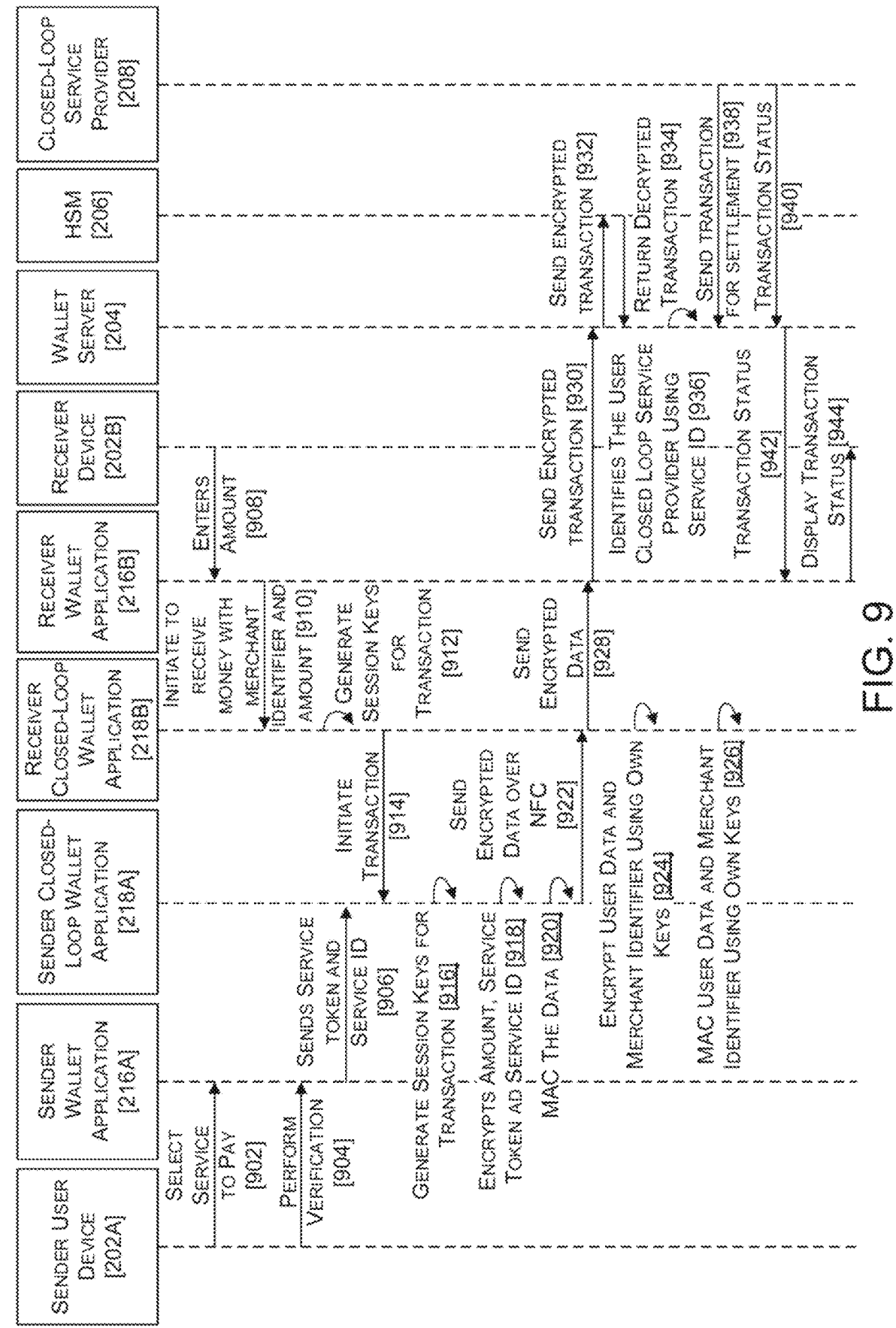
FIG. 9 illustrates an exemplary signal exchange depicting a transaction flow between two user devices a user and a merchant, in accordance with exemplary embodiments of the present invention.

Referring to FIG. 9 illustrates an exemplary signal exchange depicting a transaction flow between two user devices a user and a merchant, in accordance with exemplary embodiments of the present invention. At step [902], a sender opens his Wallet Application [216A] and selects the Service he wants to use to pay to a receiver (another user). At step [904], the sender performs local CDCVM PIN verification with the CRS applet installed on the Secure Element [202A1]. At step [906], the sender's wallet application [[216A] sends service token and service IS to Closed-loop Application in Secure Element [202A1] on the Sender's user device [202A]. The Sender's Closed-loop Application [218A] shall now be activated on the contactless interface of the Sender's device.

In parallel, at step [908], the receiver opens his Wallet application [216B] and enters an amount. The amount entry can also happen in the Sender's device [202A] by the Sender or on both the devices. At step [910], the Receiver's wallet application [216B] sends amount and the Receiver Identifier (ID) to Receiver's Closed-loop Application [218B]. Thereafter, the Receiver terminal [202B] and Sender device [202A] are tapped for the NFC transaction. At step [912], the Receiver Closed-loop Wallet Application [218B] generates session keys for transaction encryption.

At step [914], the Receiver Closed-loop Wallet Application [218B] initiates a transaction to Sender Closed-loop Wallet Application [218A]. At step [916], the Sender Closed-loop Application [218A] generates session keys for the transaction. At step [918], the Sender Closed-loop Application [218A] encrypts amount, service token and service id with session keys. At step [920], the Sender Closed-loop Application [218A] MAC's the data. At step [922], the Sender Closed-loop Application [218A] send encrypted data over NFC. At step [924], the Receiver Closed-loop Application [218B] encrypts Sender's data received over NFC and its own Receiver identifier and amount. At step [926], the Receiver Closed-loop Application [218B] MAC Sender's data received over NFC and its own Receiver identifier and amount.

At step [928], the Receiver Closed-loop Application [218B] sends the whole data to the Receiver Wallet Application [216B]. At step [930], the Receiver Wallet Application [216B] sends the encrypted transaction data to the Wallet server [204] over TLS. At step [932], the Wallet Server [204] sends the encrypted data to the HSM [206] for decryption. At step [934], the HSM [206] decrypts the transaction and validates the MAC internally and returns decrypted data to the Wallet Server [204]. At step [936], the Wallet Server [204] identifies the Closed-loop Service Provider [208] from the Sender service ID received in the transaction. At step [938], the wallet server [204] sends the transaction for settlement to the Closed-loop Service Provider [208]. At step [940], the Closed-loop service provider [208] sends the transaction status back to the Wallet Server [204]. At step [942], the Wallet Server [204] sends the transaction status to the Receiver Wallet Application [216B]. At step [944], the Receiver Wallet Application [216B] displays the transaction status to the Receiver.

Figure 10:
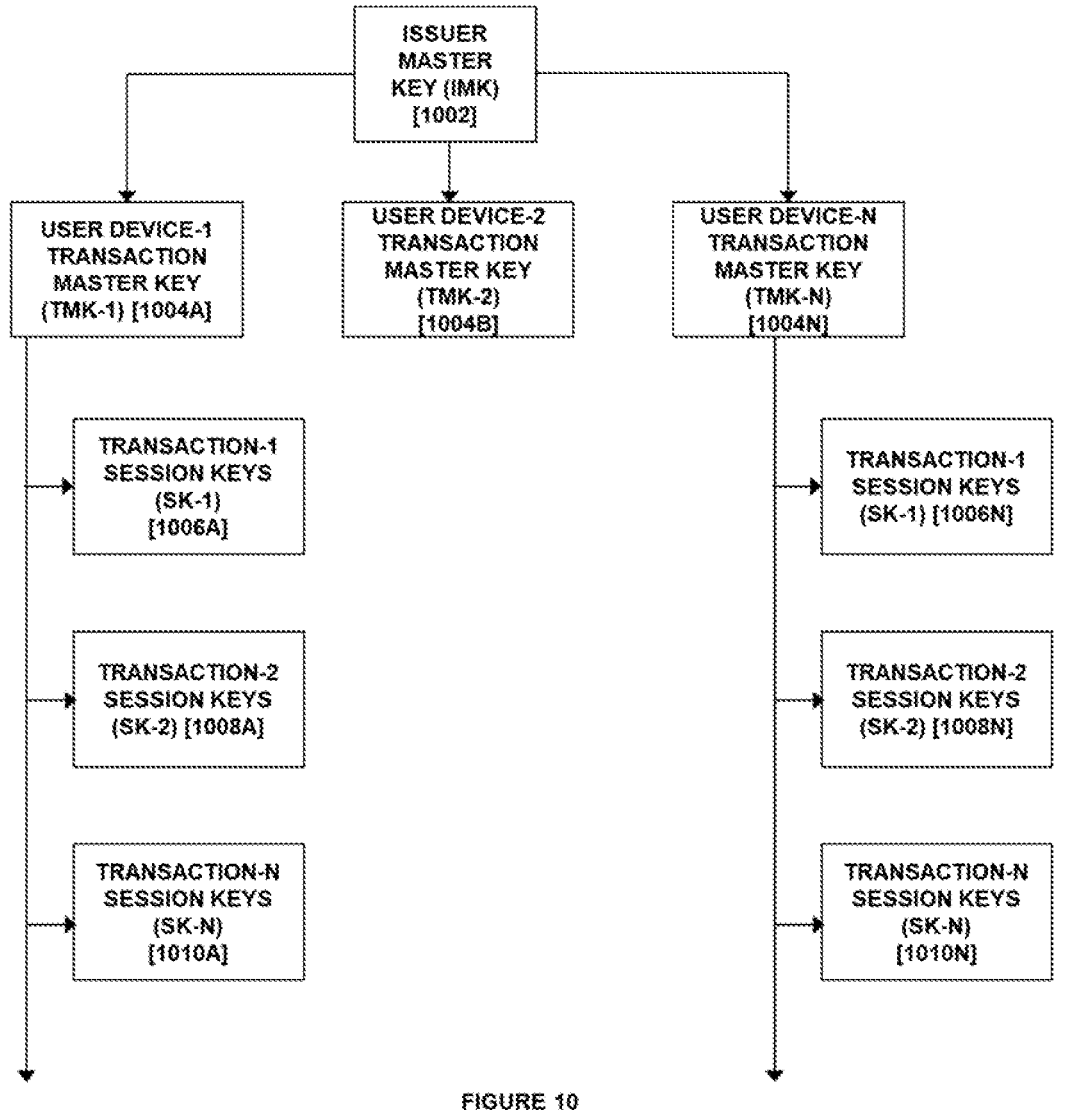
FIG. 10 illustrates an exemplary flow diagram depicting a transaction master key derivation, in accordance with exemplary embodiments of the present invention.

The present invention encompasses that the Closed-loop Application in the Secure Element [202A1, 202B1] is personalized with AES-128 bit symmetric key, referred to as a Transaction Master Key. The Transaction Master Key is unique for every Secure Element [202A1, 202B1]. The Transaction Master Key is diversified from a Master key and an identifier that uniquely identifies the Secure Element [202A1, 202B1]. Referring to FIG. 10 illustrates an exemplary flow diagram depicting a transaction master key derivation, in accordance with exemplary embodiments of the present invention. The keys involved and their hierarchy in the closed-loop Application is as follows. The Issuer Master Key (IMK) [1002] is the highest level key which is stored within the Wallet Server [204] and the HSM [206]. Multiple Issuer Master keys [1004A, 1004B, . . . 1004N, hereinafter collectively referred to as 1004] are generated for Consumer/User devices and Merchant terminals. The Transaction Master Key (TMK) [1004] is derived from IMK [1002] and will be assigned to each device. It is unique per Closed-loop Application instance.

The Session Keys (SK-enc & SK-mac) [1006, 1008, 1010] are derived from the TMK for every transaction. It is unique per transaction. In an instance, there will be two session keys generated by device during the transaction for data encryption (SK-enc) and payload signing (SK-mac). The session keys [1006, 1008, 1010] may be generated using a counter value maintained internally by the Closed-loop Application [218A, 218B].

The present invention also encompasses that the Wallet Server [204] and the HSM [206] store multiple IMKs [1002] based on Secure Element Vendor Issuer, i.e., unique per Secure Element Vendor. Identification of IMK [1002] is done via IMK identifier (IS). The Closed-loop Application stores this IMK [1002] ID during personalisation and uses it further during transaction payload so that the Wallet Server [204] and the HSM [206] can index correct IMK [1002] for particular Secure Element. Derivation of Transaction Master Key [1004] from IMK [1002] further includes additional information of TMK [1004] version. The Closed-loop Application [218A, 218B] stores this TMK [1004] Version during personalisation and use it further during transaction payload so that Wallet Server [204] and the HSM [206] can generate correct TMK [1004] for particular Secure Element.

Thus, the present invention provides a novel solution as a system and method for usage of Near-field radio communication (NFC) for performing closed-loop secure transaction based on encryption and MAC. The solution overcomes the problem of the existing art by enabling multiple closed-loop service providers on the inside the secure element of the user device for performing closed-loop secure transaction and by providing for automatic selection of closed-loop kernel on the user device depending on an instrument selected by the customer. Thus, the solution of the present invention provides for quick and hassle-free peer to peer (P2P) or peer to merchant (P2M) closed-loop transactions where a user can enroll to multiple (any/all) the Closed-loop Instruments and use them to make P2P or P2M transactions.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for performing a closed-loop transaction, comprising:

receiving a payment selection for at least one service at a secure element of a first user device, the payment selection comprising at least one of payment information, a service token, an instrument selection, or a service identifier for the at least one service;

transmitting, from the first user device, via a wireless interface, first data to a second user device, the first data comprising at least an encrypted payment selection, wherein the first data is transmitted in response to a Near Field Communication (NFC) tap between the first user device and the second user device, and wherein transmitting the first data to the second user device further comprises:

generating a session key for the payment selection received at the secure element of the first user device; and encrypting the payment selection based on the generated session key and a message authentication code; and wherein a symmetric session key for the first data is generated at a secure element of the second user device, wherein the first data is processed at the second user device to generate second data by encrypting the first data based on the symmetric session key, a second user device identifier, the message authentication code, or the payment information to generate second data;

transmitting, by the second user device, the second data to a payment server;

wherein the payment server comprises a hardware security module (HSM) configured to decrypt the second data based on the message authentication code, and to route the decrypted second data to at least one closed-loop service provider selected based on the instrument selection included in the payment selection, wherein the at least one closed-loop service provider is onboarded at the secure element of the first user device and the second user device respectively, wherein the secure element of the first user device is configured to automatically select a closed-loop kernel for transaction processing based on the instrument selected by the user, and wherein a closed-loop transaction is performed by the at least one closed-loop service provider based on the decrypted second data.

2. The method as claimed in claim 1, further comprising:

receiving a status of the closed-loop transaction from the at least one closed-loop service provider at least at one of the first user device and the second user device; and displaying the status of the closed-loop transaction on at least one of the first user device and the second user device.

3. The method as claimed in claim 1, wherein the second user device is a merchant user device, and wherein the second user device transmits the second data to a merchant payment server.

4. A system for performing a closed-loop transaction, the system comprising:

a first user device configured to:

receive a payment selection for at least one service at a secure element of the first user device, the payment selection comprises at least one of payment information, a service token, an instrument selection, and a service identifier for the at least one service, and transmit first data to a second user device via a wireless interface, wherein the first data is transmitted in response to a Near Field Communication (NFC) tap between the first user device and the second user device, wherein the first data comprises at least an encrypted payment selection, and wherein the first user device is configured to:

generate a session key for the payment selection received at the secure element of the first user device, and encrypt the payment selection based on the generated session key and a message authentication code;

wherein the first user device is further configured to enable the second user device to:

generate a symmetric session key for the first data received at a secure element of the second user device, process the first data to generate second data by encrypting the first data based on the symmetric session key, a second user device identifier, the message authentication code, and the payment information to generate second data, and transmit the second data to a payment server;

wherein the payment server comprises a hardware security module (HSM) configured to decrypt the second data based on the message authentication code, and to route the decrypted second data to at least one closed-loop service provider selected based on the instrument selection included in the payment selection, wherein the at least one closed-loop service provider is onboarded at the secure element of the first user device and the second user device respectively, wherein the secure element of the first user device is configured to automatically select a closed-loop kernel for transaction processing based on the instrument selected by the user; and wherein the at least one closed-loop service provider performs a closed-loop transaction based on the decrypted second data.

5. The system as claimed in claim 4, wherein the first user device and the second user device are further configured to:

receive a status of the closed-loop transaction from the at least one closed-loop service provider, and display the status of the closed-loop transaction.

6. The system as claimed in claim 4, wherein the second user device is a merchant user device, and wherein the second user device transmits the second data to a merchant payment server.

\* \* \* \* \*